Patented Aug. 21, 1934

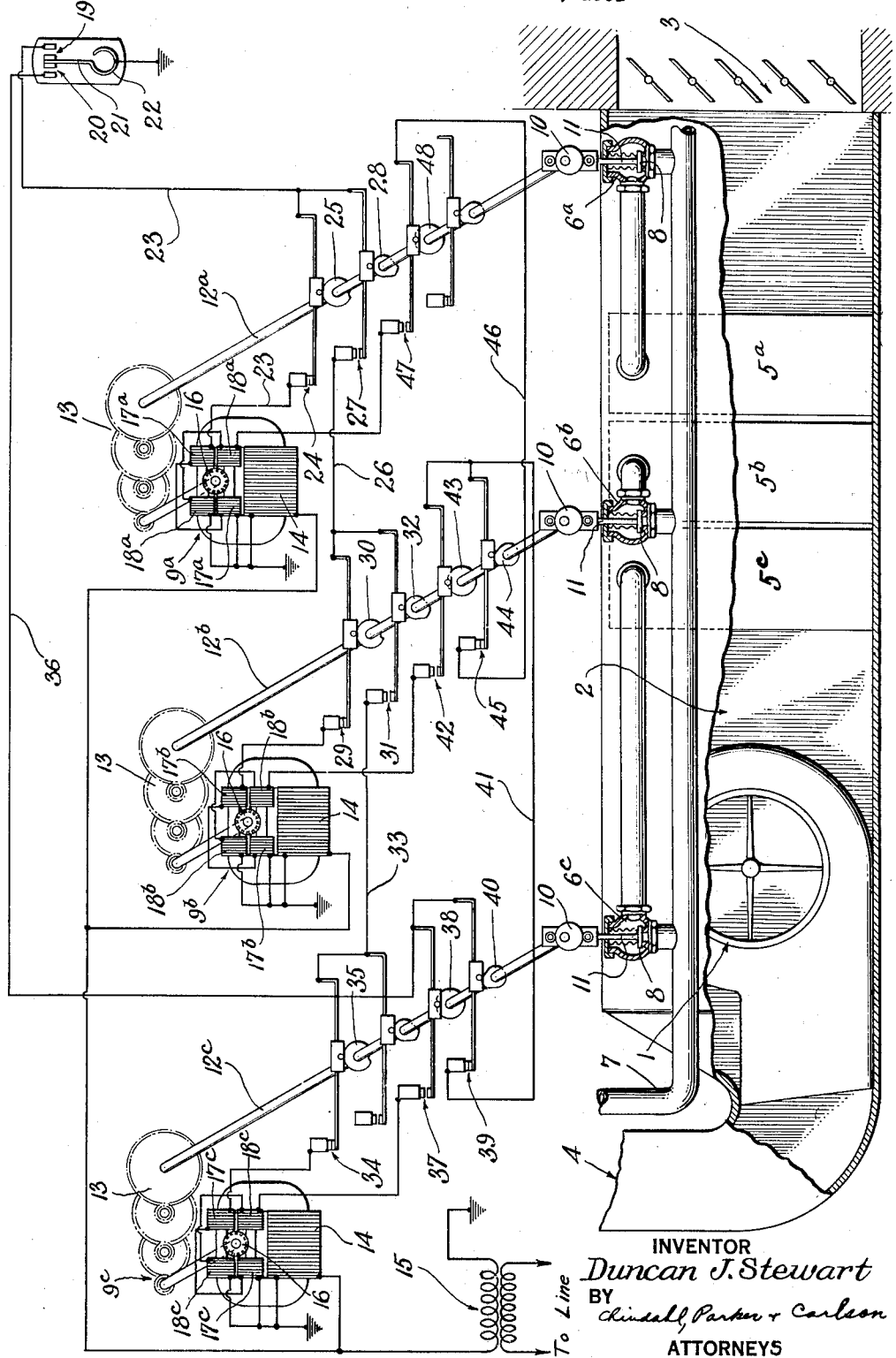

1,970,584

UNITED STATES PATENT OFFICE 1,970,584

AIR CONDITIONING SYSTEM

Duncan J. Stewart, Rockford, Ill., assignor to Howard D. Colman, Rockford, Ill.

Application October 16, 1931, Serial No. 569,214
Renewed November 8, 1933

24 Claims. (Cl. 236—74)

This invention relates to an air conditioning system having a plurality of conditioning units controlled by a single sensitive instrumentality operable automatically in response to changes in the condition of the air to which it is exposed. More particularly the invention relates to a system of the above character in which the control device acts through the medium of power operated regulators.

The primary object of the invention is to provide a new and improved system for controlling a plurality of power operated regulators of the above character from a single control device so as to cause progressive changes in the combined effect of the regulating units.

In carrying out the foregoing object, the invention contemplates the provision of a novel control mechanism acting automatically to transfer the control by the sensitive device from one power operator to the other to effect progressive reversing operation of the successive regulators.

A further object is to provide a novel control for a system of the above character in which the transfer of the control by the sensitive control device, when the regulating units are being rendered ineffectual, occurs in an order reverse from that of the transfer when the units are being rendered effectual.

The invention also resides in the novel character of the switching mechanism which is employed in effecting the transfer above referred to.

It is also an object of the invention to provide, in an air heating system, a novel thermostatic controlled power operated regulating mechanism by which the operating capacity of two independent air heaters may be varied progressively and in successive order in response to a continuation in the variation of the heated air temperature relative to a predetermined value.

Other objects and advantages of the invention will become apparent from the following detailed description taken in conjunction with the accompanying drawing which is a schematic view and wiring diagram of a portion of a heating and ventilating system embodying the novel features of the present invention. In this exemplary system, air is employed as the heat-carrying medium and is forced into the room to be heated by a power operated blower 1 which draws the air through a duct 2 having an intake 3 and an outlet 4. In passing through the duct, the air comes in contact with a bank of heaters $5^a$, $5^b$ and $5^c$ which, in the present instance, are in one form of coils or radiators supplied with heating fluid such as steam from a common source of supply (not shown).

The amount of heat imparted to the air by the combined action of the heaters is determined by the positions of regulating devices in the form of valves $6^a$, $6^b$ and $6^c$ interposed between a supply pipe 7 and the respective heaters. The members 8 of the valves are arranged to be moved toward and from the valve seats by individual power driven operators $9^a$, $9^b$ and $9^c$ capable of imparting slow and graduated movements to the members in either direction thereby throttling the admission of the heating medium to the heater coils. Preferably, a reversible operator is employed for this purpose such, for example, as the one forming the subject matter of Patent No. 1,944,699. This operator comprises a cam 10 shaped to impart reciprocatory motion to the valve stem 11 during rotation of a shaft 12 driven through speed reducing gearing 13 actuated from an electric motor driving means having two windings arranged to be energized selectively to determine the direction and extent of movement of the valve member.

In the present instance, the motor driving means comprises an alternating current induction motor of the type forming the subject matter of an application by Edgar D. Lilja, Ser. No. 540,643 filed May 28, 1931. Briefly, the motor comprises a stator of the core type enclosed by a main winding 14 and constantly energized from a source 15 of alternating current. The stator defines two poles on opposite sides of a rotor 16 of the squirrel-cage type, preferably having its inductor bars exposed at the rotor surface.

Shifting of the magnetic field around the rotor is produced by the well known action of shading coils, each enclosing one side portion of one motor pole and comprising, in the present instance, a relatively large number of turns of fine wire. The coils are arranged in pairs 17 and 18 with the coils of each connected in series relation and disposed on diametrically opposite sides of the rotor. Therefore each pair of coils constitutes a winding which when its circuit is closed causes rotation of the motor in one direction.

When the coils 17 are rendered effectual by short-circuiting the same, the magnetic flux threading the sections of the poles enclosed by these coils will lag behind the flux threading the unshaded sections enclosed by the then ineffectual coils 18 with the result that the magnetic field will shift around the rotor in a counterclockwise direction producing rotation of the rotor in the same direction and causing the associated valve member 8 to be moved away from its seat. In a similar way, clockwise rotation of the rotor and closing of the valve takes place when the coils 18 are short-circuited with the coils 17 remaining ineffectual. Owing to the poor single phase characteristics possessed by the motor above described, rotation thereof will cease when the circuits for both pairs of coils are interrupted and the position of the valve will be maintained by the friction in the speed reduction gearing.

The sensitive instrumentality employed for controlling the operators to produce progressive opening and closing of the heater valves in accordance with the requirements of the space being heated comprises a member which moves in opposite directions in response to changes in the heating requirements, closing a switch 19 when more heat is required and a switch 20 when less heat is needed. Both switches are open when the proper temperature prevails. Herein said member constitutes the tongue 21 of a thermostat having a temperature-responsive element 22 which may be exposed to the air in the duct outlet 4 or disposed in the space into which the heated air is discharged.

Transfer of the control by the thermostat from one operator to the other to effect progressive opening or closing of the valves in successive order is accomplished in the present instance by arranging the motor coils $17^a$, $17^b$ and $17^c$ in parallel branches of a circuit which includes the thermostat switch 19 and similarly placing the coils $18^a$, $18^b$ and $18^c$ in parallel branches of a circuit including the thermostat switch 20. To this end, the shading windings 17 and 18 of each motor are made electrically common and each common terminal is connected to the thermostat tongue 21 as indicated by grounding in the drawing.

The insulated contact of the switch 19 is connected to the winding $17^a$ by a conductor 23 having a switch 24 interposed therein and arranged to be controlled by a cam 25 on the operator shaft $12^a$ so as to be closed when the valve $6^a$ is closed or partially closed but to be opened when the valve reaches fully open position. The switch 24 thus determines the limit to which the valve member may be moved by its operator thereby withdrawing the operator from the control of the thermostat when the predetermined position has been reached so as to prevent damage to the operator in the event that the thermostat thereafter continues to call for heat.

In parallel with the switch 24 and the winding $17^a$ is a conductor 26 leading to the winding $17^b$ and having therein a switch 27 actuated by a cam 28 on the shaft $12^a$ and thereby closed when the valve $6^a$ is fully opened but maintained open for all other positions of this valve. Thus it will be seen that the opening of the limit switch 24 and the closure of the switch 27 as the valve $6^a$ approaches full open position transfers the control by the thermostat from the operator $9^a$ to the operator $9^b$ so that upon continuance of the room thermostat to call for heat for an interval long enough to enable the valve $6^a$ to be completely opened, the motor operator $9^b$ will be started in a direction to open its valve $6^b$. When the latter reaches full open position, a limit switch 29 normally closed by a cam 30 on the shaft $12^b$ is opened to interrupt the branch circuit through the switch 27 and the winding $17^b$.

Transfer of the control by the thermostat switch 19 from the operator $9^b$ to the operator $9^c$ occurs when the valve $6^b$ reaches full open position. This is accomplished by closure of a switch 31 actuated by a cam 32 on the shaft $12^b$ and interposed in a conductor 33 in parallel with the winding $17^b$ and in series with the winding $17^c$ and a limit switch 34 which is maintained closed by a cam 35 except when the valve $6^c$ reaches open position.

By the arrangement of limit and transfer switches above described, it will be apparent that the thermostat switch 19 will be associated successively with the operators $9^a$, $9^b$ and $9^c$ as the room thermostat continues to call for heat for a substantial period of time and that opening of one valve will be initiated when the preceding valve has reached full open position. A similar arrangement of limit and transfer switches is employed for effecting progressive closing of the valves in an order reverse to that of their opening. For this purpose, the insulated contact of the thermostat switch 20 is connected by a conductor 36 to the winding $18^c$ of the operator $9^c$ through the medium of a limit switch 37 which is maintained closed by a cam 38 for all positions of the valve $6^c$ except the fully closed position when it is allowed to open.

Just prior to the opening of the limit switch 37 as the valve $6^c$ reaches closed position, a transfer switch 39 is closed by a cam 40 on the shaft $12^c$. This latter switch is in parallel with the winding $18^c$ and leads through a conductor 41 and a limit switch 42 to the winding $18^b$ of the operator $9^b$ thereby shifting the control by the thermostat switch 20 from the operator $9^c$ to the operator $9^b$ as the valve $6^c$ reaches closed position. As the valve $6^b$ becomes fully closed, a cam 43 on the shaft $12^b$ opens the limit switch 42 and a cam 44 closes a transfer switch 45 in parallel with the winding $18^b$ thereby extending the circuit of the thermostat switch 20 through two transfer switches 39 and 45, a conductor 46 and a limit switch 47 to the winding $18^a$. Thus, after the valves $6^c$ and $6^b$ have been closed successively, closing movement of the valve $6^a$ will be initiated provided the thermostat switch 20 remains closed. A cam 48 on the shaft $12^a$ opens the limit switch 47 when the valve $6^a$ has been completely opened.

The operation of the above system will now be described assuming that the valves $6^a$, $6^b$ and $6^c$ are in closed position, in which case the limit switches 24, 29 and 34 will be closed, the limit switches 37, 42 and 47 will be open, the transfer switches 39 and 45 will be closed, and the transfer switches 27 and 31 open. Thus, the thermostat switch 19 will be connected to the winding $17^a$ of the operator $9^a$ through the medium of the conductor 23 and the limit switch 24, and the connection between the thermostat switch 20 and the winding $18^a$ will be extended through the conductor 36 and the transfer switches 39 and 45 to the then open limit switch 47.

Now when the thermostat calls for heat, closure of the switch 19 will render the shading coils $17^a$ effective, and the operator $9^a$ will be started in a direction to open the valve $6^a$. In the initial movement, the limit switch 47 will close thereby extending the circuit of the thermostat switch 20 to the winding $18^a$. The opening movement of the valve $6^a$ will continue until the thermostat switch 19 is opened, in which case the operator $9^a$ will stop and the valve $6^a$ will be held in partially open position. Or, if the thermostat switch 19 is still closed when the valve 6ᵃ becomes fully opened, the limit switch 24 will be opened and the transfer switch 27 closed with the result that the circuit for the winding 17ᵃ will be opened and a circuit for the winding 17ᵇ of the operator 9ᵇ will be completed through the transfer switch 24 and the then closed limit switch 29. As the valve 6ᵇ starts to open, the limit switch 42 becomes closed and the transfer switch 45 opened thereby placing the winding 18ᵇ within the control of the thermostat switch 20.

Assuming now that the thermostat switch 19 becomes opened when the valve 6ᵇ is partially open, the operator 9ᵇ will stop thereby holding the valve in this position until one or the other of the thermostat switches becomes closed. Assuming next that the switch 20 is closed, a circuit for the winding 18ᵇ will be completed through the conductor 36, the transfer switch 39, the conductor 41, and the limit switch 42, and the partially opened valve will be started toward closed position, the then opened valve 6ᵃ remaining open. If the closure of the thermostat switch 20 continues, the limit switch 42 will be open and the transfer switch 45 closed as the valve 6ᵇ reaches closed position so that the circuit for the winding 18ᵇ of the operator 9ᵇ will be opened and the circuit for the winding 18ᵃ of the operator 9ᵃ closed which initiates closing of the valve 6ᵃ. Closing of the latter will continue until the thermostat switch 20 becomes opened or the valve reaches completely closed position.

From the foregoing it will be apparent that with the arrangement of transfer and limit switches above described, the operator whose valve is partially opened will always be within the control of the thermostat. If all of the valves are open, the operator 9ᶜ will be the first to be started by closure of the thermostat switch 20 while the valve 6ᵃ the first to be opened when the thermostat switch 19 is closed with all of the valves closed. In the event that the condition of the thermostat changes when one of the valves is partially opened, the operator then under the control of the thermostat will maintain this intermediate position so long as both of the thermostat switches remain open. The valve may subsequently be moved in either direction depending on which of the switches 19 and 20 is next closed. Thus, the thermostat determines the direction and extent of movement of the valve with which it is associated. In this way, the capacity of one heater is varied progressively in accordance with the demands in the system until its maximum capacity has been reached whereupon the capacity of a second heater is varied progressively according to the increased demands while the first heater continues to operate at full capacity. The combined heating effect of the different radiators thus becomes adjusted automatically to meet the heating requirements prevailing in the system and slight changes in these heating requirements are compensated for by the reverse movements of the partially open valve.

No claim is made herein to the subject matter disclosed in my copending application Serial No. 551,663, filed July 18, 1931, to which the present application is subordinate.

I claim as my invention:

1. A system for controlling the temperature of an air current passing through a circulating duct comprising, in combination, a plurality of heat exchangers in said duct, individual valves for said exchangers controlling the admission of a temperature controlling medium thereto, individual operators for said valves each having an electric motor driving means with two windings selectively energizable to determine the direction and extent of movement of the valve members, a thermostat having two switches connected to the respective windings of one of said valve operators when all of said valves are closed, switching means actuated by said last mentioned operator as the latter approaches a predetermined valve-open position to interrupt the connections between said thermostat switches and the windings of such operator and establish connections for said switches with the windings of another of said operators, and switching means actuated in the approach of said last mentioned operator to valve-closing position to transfer the connections with said thermostat switches back to said first mentioned operator.

2. Mechanism for regulating the temperature of air by the combined action of a plurality of heat exchangers comprising, in combination, a plurality of valves each controlling the delivery of temperature controlling medium to one of said exchangers and having electric driving means with two windings selectively energizable to cause opening and closing of the associated valve to varying degrees, a thermo-responsive device having a switch controlling the energization of said valve-opening windings and a second switch controlling the energization of said valve-closing windings, switching means actuated automatically as an incident to opening of one of said valves to a predetermined extent to transfer the control of said first switch from the valve-opening winding of the active operator to the corresponding winding of another operator, and switching means acting automatically as an incident to the movement of said last mentioned operator into valve-closing position to transfer the control of said second switch from the valve-closing winding of the then active operator back to the valve-closing winding of the first mentioned operator.

3. An air conditioning system having, in combination, a plurality of air conditioning units comprising, in combination, a plurality of valves each variably controlling the effectiveness of one said units and actuated between open and closed positions by a reversible power operator having a valve-opening and a valve-closing winding, a control device adapted to control the selective energization of said windings, and switching means for transferring the control by said device from the windings of one operator to the corresponding windings of another whereby when one valve is partially open, only the operator for such valve will be controllable by said device.

4. In a heating system, the combination of a plurality of heating radiators, individual valves for varying the effectiveness of said radiators to cause varying amounts of heat to be supplied by the system according to the degree of opening of said valves, a power operator for each valve adapted to move the valve between closed and open positions or to maintain the valve partially open, a single thermostat responsive to variations in the heating requirements placed upon the system, and means acting automatically to shift the control of said thermostat from one of said valve operators to another upon a prolonged call of the thermostat for heat or when the thermostat ceases to call for heat for a prolonged interval.

5. In a temperature control system, the combination of a plurality of temperature control devices movable between "on" and "off" positions, individual electric operators for said devices each having a winding for causing movement of the associated device toward "on" position and a second winding for causing reverse movement of the device, an energizing circuit having parallel branches each including one of said first mentioned windings, an energizing circuit having parallel branches each including one of said second windings, two thermostatically controlled switches interposed respectively in said circuits, transfer switches interposed in branches of said first mentioned circuit for determining the winding controllable at any time by one of said switches, transfer switches interposed in the branches of said other circuit, and means for closing said first mentioned transfer switches successively as the successive devices approach their "on" positions and said second transfer switches in reverse order as the devices approach their "off" positions.

6. In a temperature control system, the combination of a plurality of temperature regulating devices, individual power operators for moving each of said devices between two limit positions while permitting any one of the devices to be stopped in an intermedite position, a thermostat adapted to be associated with any one of said operators and controlling the direction and extent of operation of such operator, and means actuated from said operators for associating the operators with said thermostat in a predetermined order in response to the continued call of the thermostat for heat and in reverse order when the thermostat thereafter ceases to call for heat for a prolonged interval.

7. In an air conditioning system, the combination of a plurality of temperature regulating devices, individual power operators for moving each of said devices between two limit positions, a control element having two switches selectively operable to control the direction and extent of operation of any one of said operators, means operating upon prolonged closure of one of said switches to transfer the control thereby successively to one or more of the other operators whereby to cause said devices to be moved to one of their limit positions in a predetermined order, and means for transferring the control of said other switch to the different operators in reverse order upon subsequent prolonged closure of said last mentioned switch.

8. In a temperature control system, the combination of a plurality of temperature regulating devices having individual power operators for moving the respective devices between two limit positions, a thermostat, and means cooperating with said thermostat to control said operators and cause movement of said devices successively from one limit position to the other in response to a prolonged call for heat by the thermostat, said last mentioned means acting to cause movement of said devices back to the first limit positions successively and in reverse order when the controlling temperature exceeds that for which the thermostat is set to respond.

9. In an air conditioning system, the combination of two control valves, a power operator for one of said valves, a second operator for the other valve, a control device adapted to control the direction and extent of operation of the operator with which it is, at any time, associated, and means actuated by said operators and acting automatically to place said first operator only under the control of said device when both of said valves are closed or the first valve is partially open and for transferring the control of said device to said second operator after said first valve has been opened to a predetermined degree.

10. In an air conditioning system, the combination of a plurality of regulating devices, individual electric operators therefor each having a winding adapted when energized to cause movement of the associated device in one direction, a circuit having a plurality of parallel branches each including one of said windings, a control switch in said circuit common to said branches and adapted when closed to cause one of said windings to be energized, and switching means actuated by one of said operators as an incident to movement of the associated device into a predetermined position to interrupt the branch of said circuit through the winding of such operator and close a switch in the branch of another of said windings whereby to transfer the control by said switch from one operator to another.

11. In an air conditioning system, the combination of two regulating devices each movable toward and from a limit position, individual electric operators for said devices each including a winding adapted when energized to cause the associated device to be moved toward said limit position, a control switch for controlling the energization of said windings, and a switch arranged to be closed and opened respectively as an incident to the movement of one of said devices into and out of its limit position, the closure of said switch serving to connect said switch to the winding of another of said operators whereby continued closure of said control switch will initiate movement of another of said devices toward its limit position.

12. In a temperature control system, the combination of two temperature regulating devices each movable toward and from a limit position, individual electric operators for said devices each including a winding adapted when energized to cause the associated device to be moved toward said limit position, a thermo-responsive switch for controlling the energization of said windings, a switch in the circuit of one of said windings adapted to be closed and opened respectively in the movement of one of said devices into and out of its limit position, and means actuated simultaneously with the closure of said second switch for withdrawing the other device from the control of said thermo-responsive switch.

13. In an air conditioning system, the combination of a plurality of power-operated regulating devices movable varying distances between two limit positions, a sensitive control element adapted to be operatively associated with said devices successively one at a time and controlling the direction and extent of movement of the associated device, and means actuated by the active device in approaching one of said limit positions to transfer the control of said element from such active device to one of the then inactive devices.

14. In a heating system, the combination of a heat supplying device, a power operator for effecting a slow and graduated movement of said device between "on" and "off" positions whereby to determine the direction and extent of movement of the device, an auxiliary heat supplying device, a power operator therefor determining the direction and extent of movement thereof, a thermostat associated with said first mentioned operator when both of said devices are in "off" position, and means for transferring the control of the thermostat to said second operator and thereby initiating movement of said auxiliary device toward "on" position when said thermostat calls for heat for a time interval of sufficient length to move said first mentioned device to "on" position from its "off" position or any intermediate position.

15. In a heating system, the combination of a heat supplying device movable between "on" and "off" positions, a power operator for effecting a slow and graduated movement of said device to determine the direction and extent of movement thereof, a second device, a power operator therefor for determining the direction and extent of movement thereof between "on" and "off" positions, a thermostat associated with said second operator when said first mentioned device is in "on" position and said second device is in "on" position or an intermediate position, and means for transferring the control of said thermostat to said first mentioned operator automatically when said thermostat ceases to call for heat for a period sufficient to enable said second device to be moved to "off" position.

16. An air conditioning system having, in combination, a plurality of controlling devices, a power operator for moving one of said devices variable distances in opposite directions between two limit positions, automatic control means controlling said operator when the associated device is disposed between said positions or in one of the positions, a power operator for moving the other device in opposite directions, and means actuated automatically as an incident to the movement of the first mentioned device into its other limit position to withdraw said first mentioned operator from control by said control means and place said second operator within such control.

17. In a temperature control system, the combination of a plurality of regulating units each having an individual power operator for turning the unit on or off, a thermostat responsive to a predetermined temperature value, and means controlled by said thermostat initiating operation of said operators successively to turn on said units when the temperature detected by the thermostat is above said value and to cause operation of the operators in reverse order when the temperature is below said value.

18. In a temperature control system, the combination of a plurality of temperature regulating devices movable between "on" and "off" positions, individual power operators each adapted to move one of said devices varying distances between said positions, thermostatic means responsive to rises and falls in temperature above and below a predetermined value, and means controlling said operators to cause movement of said devices to "on" position successively in response to a fall in temperature below said value and to "off" position in reverse order in response to a rise in temperature above value.

19. An air conditioning system having, in combination, a plurality of regulating devices, individual power operators for moving the respective devices back and forth between limit positions, a control element movable into different positions in response to different changes in the condition of the air to which it is exposed, means actuated by said operators for associating the operators successively and in a predetermined order with said element when the latter remains in one of said positions for a predetermined time interval, and in reverse order when the element thereafter remains in another position for a time interval.

20. An air conditioning system having, in combination, two regulating devices, individual power actuated operators therefor for moving the devices in opposite directions, a control element governing said operators to determine the direction and extent of movement of said devices thereby, means operable upon movement of one of said devices into a predetermined position in one direction to transfer the control of said element to the operator for the other device whereby the latter will be moved by its operator in a corresponding direction, and means operable upon reverse movement of the latter device into a predetermined position to transfer the control of said element back to the operator for the first mentioned device.

21. A system of the class described having, in combination, a plurality of devices each to be moved in opposite directions between limit positions and stopped in any intermediate position, individual power operators for the respective devices each adapted, when inactive, to maintain the position in which the associated device was stopped, a control element adapted when associated with one of said operators to govern the extent of operation thereof, and means governed by the positions of said device for associating said element with different ones of said operators one at a time.

22. In an air conditioning system, the combination of two regulating devices each having an individual power actuator, a control instrumentality, and means operating automatically to place said instrumentality selectively in control of one or the other of said actuators according to the condition of the other actuator.

23. An air heating system having, in combination, two independent heaters arranged to deliver heat to air the temperature of which is to be controlled, independent regulating members movable in opposite directions to vary the heating capacity of the respective heaters, power driven mechanism for imparting graduated regulating movements selectively to said members, thermostatic means arranged to detect a rise of the air temperature above or a fall below a predetermined value and governing said mechanism in response to variations from such predetermined value to cause one of said heaters to be maintained ineffectual by the mechanism and the capacity of the other heater to be increased and decreased respectively during the continuance of the air temperature below or above said predetermined value, said thermostatic means controlling said mechanism at the same predetermined value of the air temperature after the full capacity of one heater has been reached to cause continual operation of the latter heater at full capacity and the capacity of the other heater to be increased and decreased respectively during the subsequent continuance of the air temperature below or above said predetermined value.

24. An air heating system having, in combination two independent heaters arranged to deliver heat to a space to be heated, independently movable regulating members movable in opposite directions to vary the heating capacity of respective heaters progressively between maximum and minimum limits, reversible electric motor driving means, a thermostat having first and second switches controlling the direction and extent of operation of said motor driving means and respectively closed in response to a rise of air temperature above and a fall below a predetermined value, and mechanism actuated by said driving means to impart graduated regulating movements to said members and acting to maintain operation of one of said heaters at minimum capacity until the capacity of the other heater has been increased to a maximum by continued closure of the said second switch, whereby the combined capacity of the heaters is adjusted in accordance with the demands on the system, said mechanism acting during subsequent continued closure of the first switch to maintain operation of the second heater at full capacity until the capacity of the first heater has again been reduced to the minimum.

DUNCAN J. STEWART.

CERTIFICATE OF CORRECTION.

Patent No. 1,970,584.                                  August 21, 1934.

DUNCAN J. STEWART.

It is hereby certified that error appears in the printed specification of the above numbered patent requiring correction as follows: Page 1, line 53, before "heaters" insert conditioning devices or; and line 54, for "one" read the; page 3, line 122, claim 3, after "one" insert of; and that the said Letters Patent should be read with these corrections therein that the same may conform to the record of the case in the Patent Office.

Signed and sealed this 9th day of October, A. D. 1934.

(Seal)

Leslie Frazer
Acting Commissioner of Patents.